(12) United States Patent
Kulakowski et al.

(10) Patent No.: US 6,693,859 B1
(45) Date of Patent: Feb. 17, 2004

(54) GRIPPER ASSEMBLY APPARATUS FOR INTERFACING WITH A STORAGE DEVICE

(75) Inventors: John Edward Kulakowski, Tucson, AZ (US); Rodney Jerome Means, Tucson, AZ (US); Jesse Lee Thrall, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 09/843,664

(22) Filed: Apr. 26, 2001

(51) Int. Cl.[7] .......................... G11B 17/22; G11B 15/68
(52) U.S. Cl. ...................................... 369/30.43; 360/92
(58) Field of Search ................................ 369/36, 37–38, 369/30.31, 30.43, 30.44; 711/4, 111–112, 114; 710/7; 360/92

(56) References Cited

U.S. PATENT DOCUMENTS

| | | | |
|---|---|---|---|
| 5,435,737 A | | 7/1995 | Haga et al. |
| 5,703,843 A | * | 12/1997 | Katsuyama et al. ..... 369/30.33 |
| 5,752,257 A | | 5/1998 | Ripoll et al. |
| 5,761,032 A | | 6/1998 | Jones |
| 5,875,063 A | | 2/1999 | Corrington et al. |
| 5,925,119 A | | 7/1999 | Maroney |
| 5,970,030 A | | 10/1999 | Dimitri et al. |

FOREIGN PATENT DOCUMENTS

WO    9318517    9/1993

OTHER PUBLICATIONS

U.S. patent application Ser. #09/843,665, filed on Apr. 26, 2001, entitled, "Storage Device Apparatus Having Multiple Interfaces", invented by DJ Winarski; JL Trall; RJ Means; and JE Kulakowski.

U.S. Patent application Ser. #09/843,657, filed on Apr. 26, 2001, entitled, "An Automated Library System Including A Gripper Assembly Apparatus For Interfacing With A Storage Device", invented by DJ Winarski; JL Trall; RJ Means; and JE Kulakowski.

National Committee for Information Technology Standards, "Information Technology—SCSI–3 Medium Changer Commands (SMC)", Mar. 4, 1998, NCITS T10, Project 999D, Revision 10a, Working Draft, pp. 1–68.

* cited by examiner

*Primary Examiner*—George J. Letscher
(74) *Attorney, Agent, or Firm*—David W. Victor; Konrad Raynes & Victor LLP

(57) ABSTRACT

Provided is a gripper assembly including a gripper capable of engaging a storage device having a data interface through which data is transferred to a storage medium within the storage device. The gripper assembly includes extending members capable of engaging the storage device, a data interface capable of engaging the storage device data interface to allow data communication with the storage medium in the storage device, and movement electronics to move the gripper in at least one direction.

32 Claims, 9 Drawing Sheets

GRIPPER ASSEMBLY APPARATUS FOR INTERFACING WITH A STORAGE DEVICE

RELATED APPLICATIONS

This application is related to the following commonly assigned and copending United States patent applications filed on the same date herewith and which are incorporated herein by reference in their entirety:

"Storage Device Apparatus Having Multiple Interfaces" by Daniel J. Winarski, Jesse L. Trail, Rodney J. Means, John E. Kulakowski, having Ser. No. 09/843,665; and "An Automated Library System Including a Gripper Assembly Apparatus for Interfacing with a Storage Device" by Daniel J. Winarski, Jesse L. Trail, Rodney J. Means, John E. Kulakowski, having Ser. No. 09/843, 657.

BACKGROUND OF THE INVENTION

1. Field of the Invention

The present invention relates to a gripper assembly apparatus for interfacing with a storage device.

2. Description of the Related Art

A tape library is comprised of multiple tape cartridges that may be separately accessed and handled by a robotic gripper assembly. The gripper assembly is capable of moving the tape cartridges between one or more racks of storage cells in which the cartridges are stored and a tape drive. If a user wants to access data on a tape cartridge in a cell, then the robotic gripper assembly must remove a tape cartridge from one tape drive, move the dismounted tape cartridge to one storage cell, move the gripper assembly to the storage cell to access the requested tape cartridge, and then transfer the cartridge to the tape drive for mounting and data access.

Tape libraries allow for storage of substantial amounts of data at a low cost. However, dismounting a tape cartridge from one drive and mounting another tape cartridge from the rack of cells can take a substantial amount of time. Such delays in providing an application access to data in an unmounted tape cartridge can adversely affect the performance of the application.

Due to concerns over the time required to mount tapes in a tape library, tape library developers continually strive to reduce cycle time. The cycle time indicates the time for the gripper assembly to dismount a tape from a current tape drive, return the tape cartridge to its assigned storage cell, access the requested tape cartridge from another cell, and then move and insert the accessed tape cartridge into one of the tape drives.

For these reasons, there is a need in the art to provide improved technology for providing a library of storage devices.

SUMMARY OF THE PREFERRED EMBODIMENTS

Provided is a gripper assembly including a gripper capable of engaging a storage device having a data interface through which data is transferred to a storage medium within the storage device. The gripper assembly includes extending members capable of engaging the storage device, a data interface capable of engaging the storage device data interface to allow data communication with the storage medium in the storage device, and movement electronics to move the gripper in at least one direction.

Further, the storage device further includes a power interface through which power is supplied to the storage device and the gripper assembly further includes a power interface capable of engaging the storage device power interface to transfer power to the storage device.

Still further, the data interface is capable of data communication with the storage device while the gripper assembly moves the storage device from a first location to a second location.

Moreover, the data interface on the gripper assembly may further communicate Input/Output requests to the storage device.

The described implementations provide a gripper assembly that is capable of interfacing with a storage device to communicate power and data to the storage device, such as a hard disk drive. Such an arrangement is particularly useful for an automated tape library where the gripper assembly may begin providing power and allowing I/O requests to be transmitted to the storage device while the storage device is transferred en route to a drive interface on the library backplane. This arrangement allows communication with the storage device without the delay of having to transfer the storage device to an available drive interface on the library backplane.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1A:
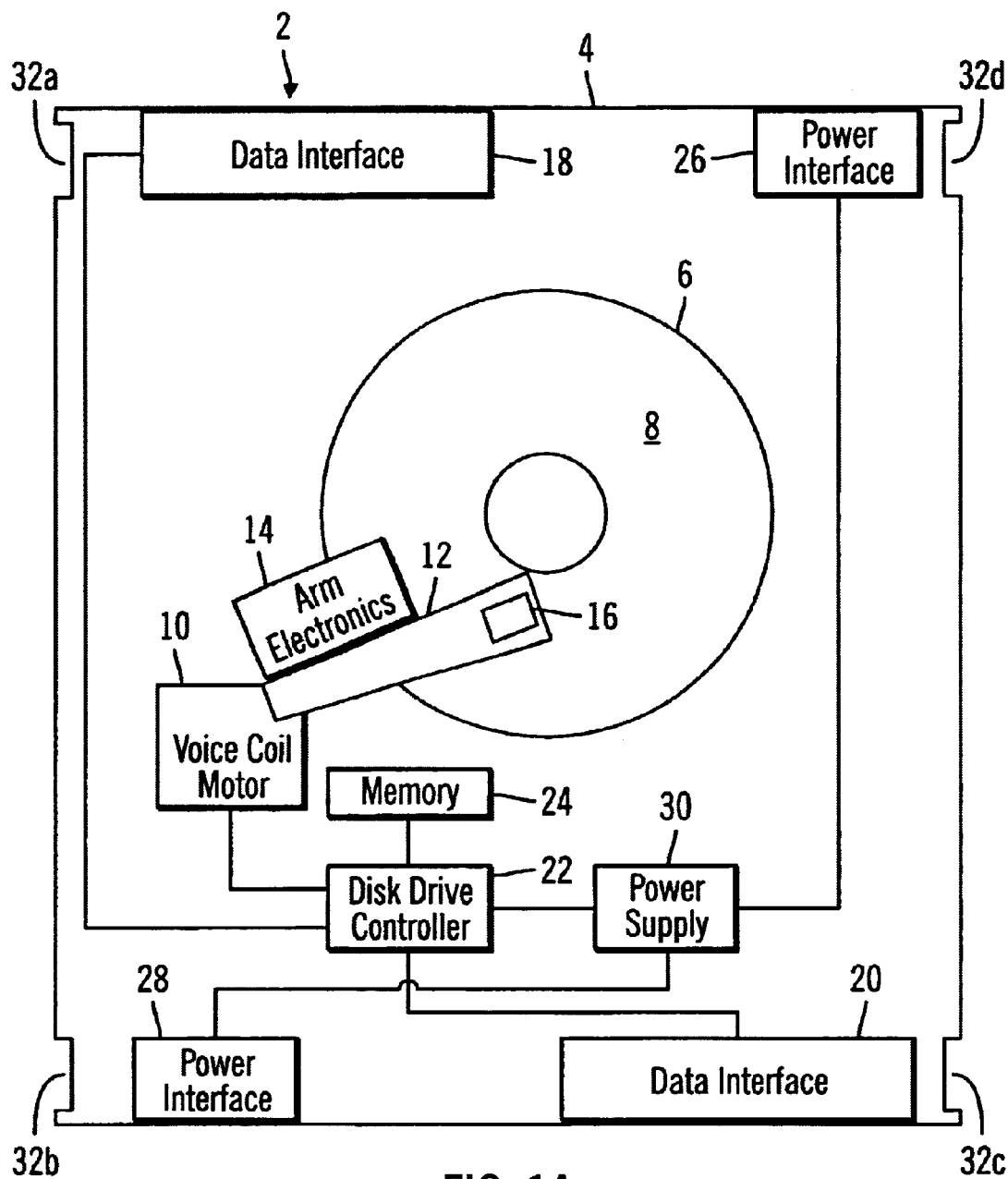
FIGS. 1a and 1b illustrate a design of a hard disk drive in accordance with implementations of the invention.

FIG. 1a illustrates a dual-end hard disk drive 2 in accordance with certain implementations of the invention. The disk drive components are maintained in a housing 4 and include a rotating disk 6 having at least one recording surface 8 for storing information, a motor (not shown) for rotating the disk, a voice coil motor 10, an actuator arm 12, actuator electronics 14, and a transducer 16. The transducer 16 is positioned in close proximity to the recording surface 8 to read and write data to the disk in a manner known in the art, e.g., through a magnetoresistive (MR) or giant magnetoresistive (GMR) read/write head or compound actuator head structure as known in the art. The arm electronics 14 provides carefully monitored power to the transducer 16 on the actuator 12. The arm electronics 14 preamplifies the low level read signal from the transducers, e.g., MR and GMR transducers. The preamplified signal from the arm electronics 14 is sent to the data. channel (not shown) for detection. The design and arrangement of components of disk drive systems are further described in "Magnetic Disk Drive Technology: Heads, Media, Channel, Interfaces, and Integration," by Kanu G. Ashar (1997), which publication is incorporated herein by reference in its entirety.

The dual-end disk drive 2 includes data interfaces 18, 20 on opposite sides of the disk drive 2, which are both capable of receiving data from an external device, such as a computer bus. The data interfaces 18, 20 may utilize any data interface architecture and protocol known in the art, such as the Integrated Drive Electronics/AT Attachment Interface (IDE/ATA), the Small Computer System Interface (SCSI), Fibre Channel, etc.

The interfaces 18 and 20 are connected to a common disk drive controller 22, which manages the disk drive operations. The controller 22 uses memory 24, which may comprise a volatile memory device, to buffer data to write to the recording surface 8 and data read from the recording surface 8 to return to an external system. The disk drive controller 22 manages the transfer of data from the memory 24 to the actuator arm 12 to write to the recording surface 8 in a manner known in the art. The disk drive controller 22 is capable of receiving data from both data interfaces 18, 20.

The dual-end disk drive 2 further includes power interfaces 26, 28 on both ends of the disk drive. The power interfaces 26, 28 supply power to the power supply 30 which regulates the voltage suppled to the disk drive controller 22, voice coil motor 10, actuator arm 12, and all other components in the dual-end disk drive 2. The power supply 30 may also act as a power buffer to continue supplying power to the disk drive 2 when the power source is being switched from power interface 26, 28. In certain implementations, the power connections are make-before-break, which means that the power connection at one interface 26 or 28 is made before power is broken at the other interface 26 or 28. Power supply 30 is sufficiently robust to accommodate power from both interfaces 26, 28 and still modulate that power to the needs of hard disk drive 4. Additionally, power supply 30 could include a rechargeable battery to function as a power buffer for hard disk drive 4 in case the power connections are break-before-make.

The dual-end disk drive 2 implementation of FIG. 1a is capable of receiving power from interfaces 26 and 28, as well as data from interfaces 18 and 20. Further, the dual-end disk drive 2 includes indentations 32a, b, c, d on the side of the housing 4 to improve the capability of a gripper assembly, discussed below, to access and move the disk drives.

Figure 1B:
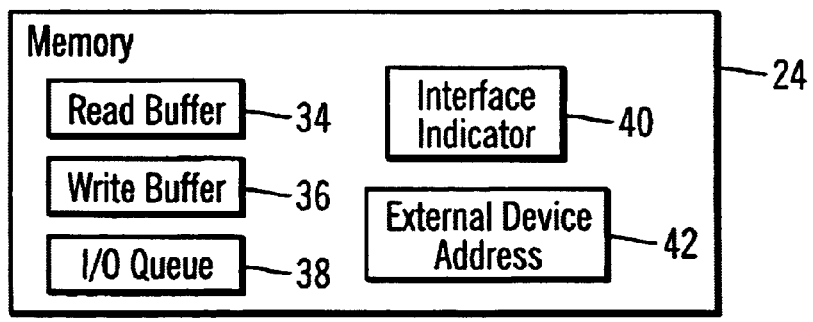

FIG. 1b further shows an implementation of the memory 24 in the disk drive 2. A read buffer 34 stores data retrieved from the recording surface 8 to return to a requesting application. A write buffer 36 stores data received from the external application to write to the recording surface 8. I/O queue 38 queues I/O requests in a manner known in the art, e.g., First-In-First-Out (FIFO). An interface indicator 40 indicates the set of data and power interfaces at one end 18, 26 and/or 20 and 28 that are engaged. The interface indicator 40 may indicate one end of data and power interfaces or both ends if both ends are engaged. If the dual end disk drive is engaged on both ends, then the interface indicator 40 may indicate one end as the primary interface to use and the other end as a secondary interface that is engaged but not used for I/O. An external device address 42 indicates the address of the device to which the disk drive controller 22 communicates data and other status information. This address may comprise the address of the gripper assembly and drive interface 62 or the address of a drive interface on the library backplane 60 shown in FIG. 2 and discussed below. The external device address 42 may comprise a primary and secondary address if both ends are engaged, where the primary address indicates the address currently used for data communication.

In certain implementations, data may be stored on only one or both surfaces of the disk 8. In such case, there would be multiple suspensions connected to the arm with transducer heads to read and write on both surfaces of the disk. Moreover, as known in the art, the disk drive may include a stack or platters of disks that are mounted in parallel on a spindle for simultaneous rotation. In such case, there would be multiple heads, one for each recording surface of each disk in the stack. In these multi-platter systems, a cylinder is formed of the combination of concentric rings on multiple disks along the same vertical axis.

Figure 2:
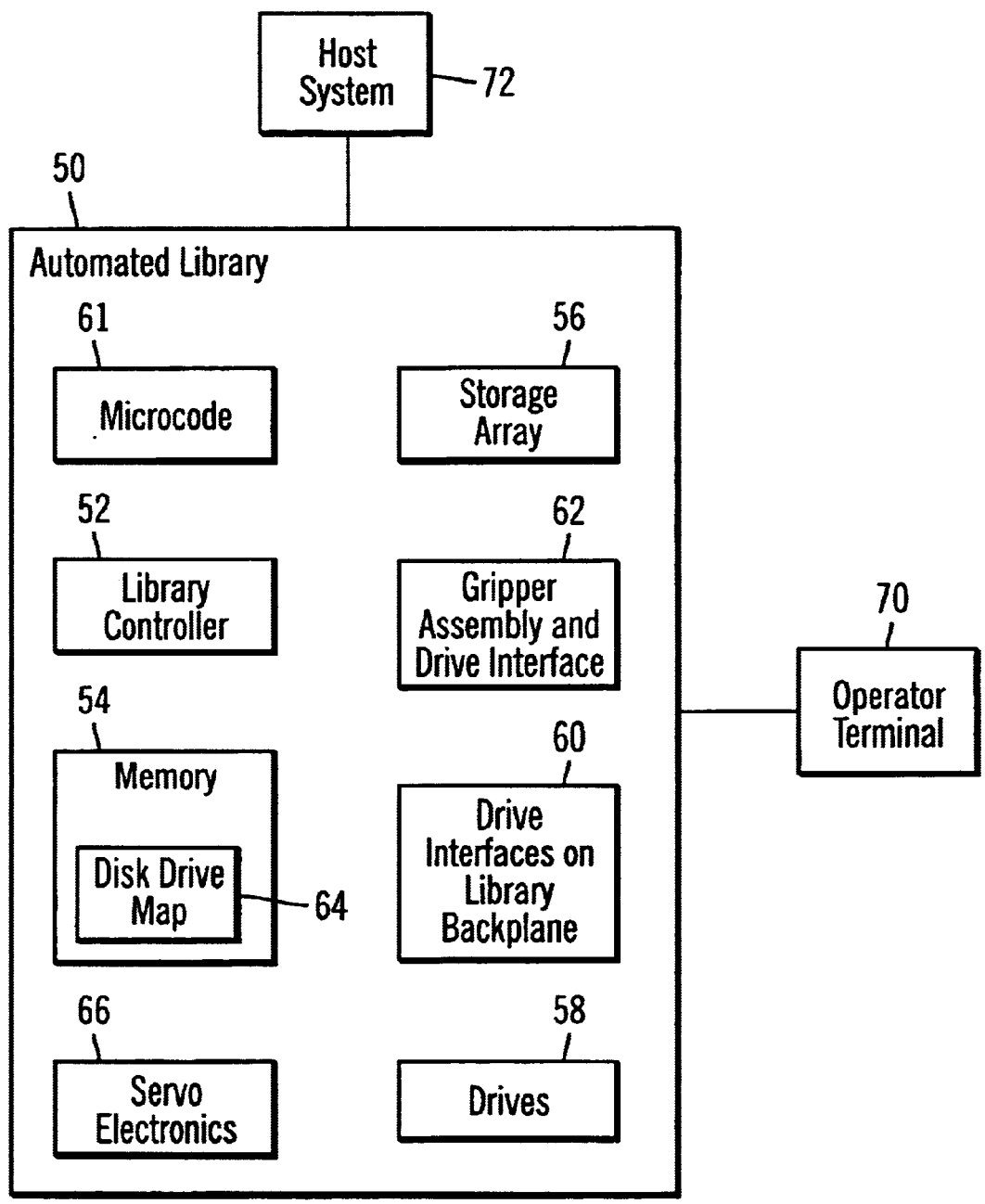
FIG. 2 illustrates a block diagram of the components in an automated library in accordance with implementations of the invention.

FIG. 2 illustrates components within an automated library 50 in which the dual-end hard disk drives described with respect to FIG. 1a are used. The automated library 50 includes a library controller 52, a memory 54, accessible to the library controller 52, a storage array 56 of storage cells for holding hard disk drives 58, including the dual-end hard disk drive 58 (shown as dual-end disk drive 2 in FIG. 1a, input/output slots (not shown) through which the user may insert the dual-end hard disk drives 58, and one or more disk drive interfaces on the library backplane 60 in which the data interface 18, 20 of the dual-end disk drives 60 may be connected to allow for the transfer of data. In certain implementations, the dual-end disk drives 58 can be "hot plugged" in and out of the drive interfaces on the library backplane 60 and gripper assembly 62. The disk drive interfaces on the library backplane 60 are on a backplane of the automated library 50. A gripper assembly and drive interface 62 provides a gripper and other movement electronics to transfer the disk drives 58 between the storage array 56 and drive interfaces on the library backplane 60.

The library controller 52 is preferably implemented as a microprocessor and includes interfaces and code to control and manage the operation of the components in the automated library 50, including the gripper assembly and driver interface 62 and drive interfaces on the library backplane 60. The library controller 52 operates under control of microcode 61, which is embedded in a non-volatile storage unit, e.g., hard disk drive, PROM, EEPROM, non-volatile RAM, etc. The library controller 52 utilizes the memory 54 to store various information, such as a dual-end disk drive map 64 maintaining information on where each hard disk drive 58 is located, i.e., in the storage array cell 56, in the gripper assembly and drive interface 62 en route from a storage cell array to the drive interface on the library backplane 60. If the library element includes a disk drive, then the disk drive map 64 would include information on the contents of the disk drive maintained in the library element, such as volume information. The library 50 further includes servo electronics 66 that provides the interface between the library controller 52 and other electro-mechanical components to convert digital control signals from the library controller 52 to signals capable of controlling electromechanical components.

A library operator may directly control operations and the management of the dual-end disk drives 2 through an operator terminal 70, consisting of a display device and keyboard, to interface with the library controller 52. A host system 72 may send commands to the library controller 52 to control operations within the automated library 50 or perform read or write operations on volumes within cartridges managed by the library controller 52. The host system 72 and library 50 may communicate via SCSI adaptors and a SCSI cable. In further embodiments, the host system 72 and library 50 may communicate via any communication means known in the art, e.g., LAN, WAN, Storage Area Network (SAN), Fibre Channel, etc.

Figure 3:
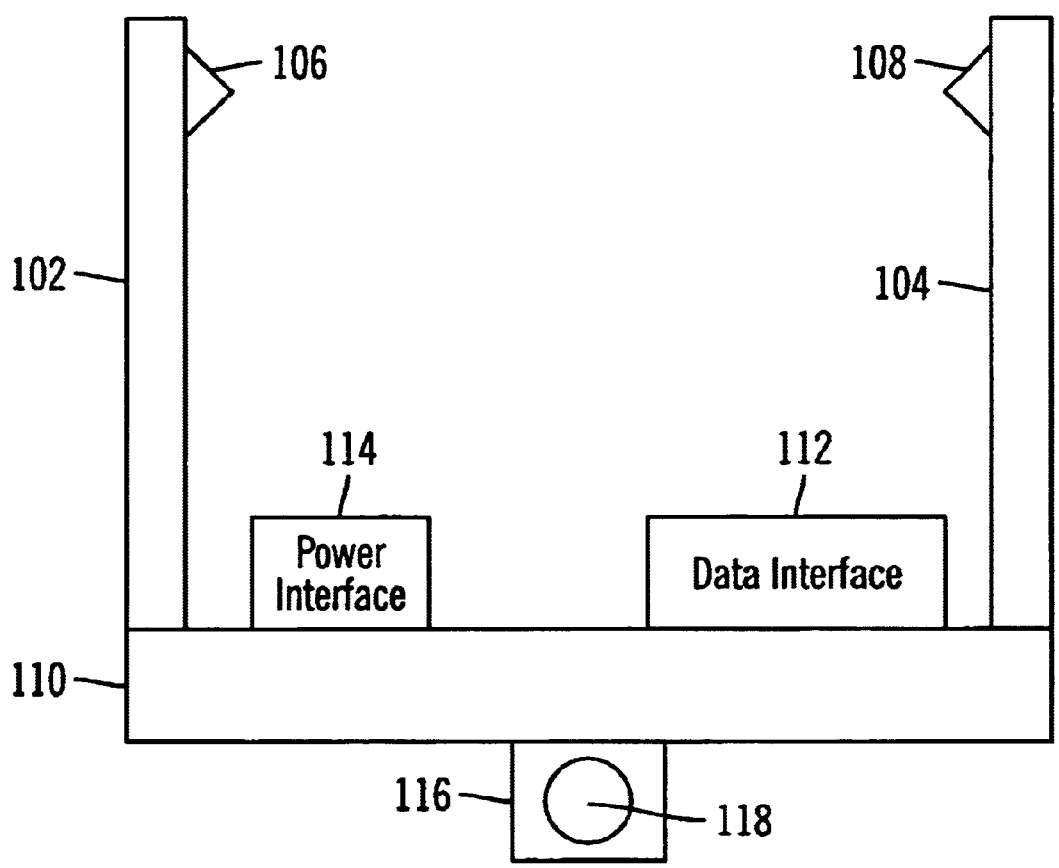
FIG. 3 illustrates a design of a gripper assembly in accordance with implementations of the invention.

FIG. 3 illustrates one implementation of the gripper assembly and drive interface 62. The gripper assembly and drive interface 62 engages the dual-end disk drive 2 shown in FIG. 1a and any other drives 58 in the system, such as hard disk drives known in the art. The gripper assembly 62 includes a gripper pair 102, 104. Extendable protrusions 106 and 108 on the gripper pair 102 and 104, respectively, are intended to mate with a pair of indentations 32a, b, c, d (FIG. 1a) on the disk drive 2 to provide a solid engagement or grip of the dual-end disk drive housing 4. To release the disk drive 2, the gripper assembly 62 could release or retract the protrusions 106 and 108 to disengage from the indentations 32a, b, c, d. The gripper 62 further includes a backplane 110 including a data interface 112 and power interface 114 that is capable of mating with the data interfaces 18, 20 and power interfaces 26, 28 on both sides of the dual-end disk drive 2 to allow for the transfer of data and power from the gripper backplane 110 to the dual-end disk drive 2. The gripper assembly 62 may include a power supply to supply power to the storage device through the power interfaces, or receive power from a power supply source external to the gripper assembly 62.

The gripper 62 further includes a mounting bracket 116 that engages a vertical shaft 118. The library controller 52 can control the gripper assembly 62 to move in the vertical direction along the shaft 118. The gripper assembly 62 may further include servo-electronics to allow for movement in the horizontal plane to insert or remove a hard disk drive into a storage cell, e.g., storage bin, or the drive interfaces on the library backplane 60.

Figure 4:
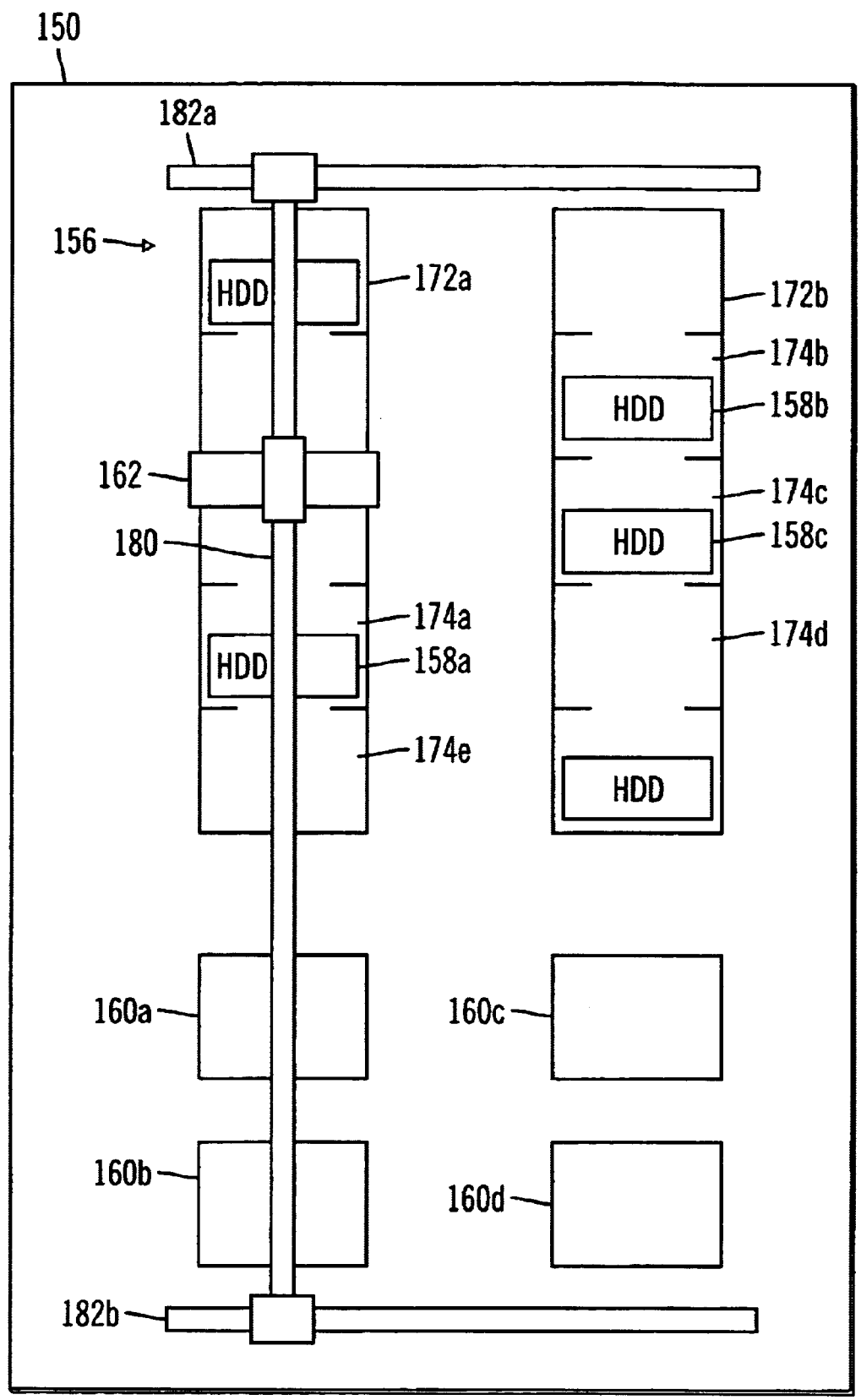
FIG. 4 illustrates a layout of the storage cells and disk drives in an automated library in accordance with implementations of the invention.

FIG. 4 provides one possible arrangement of an automated library of dual end disk drives. The storage array 56, drive interfaces on the library backplane 60, and gripper assembly and drive interface 62 in the automated library 50 of FIG. 3 are shown as storage array 156, drive interfaces 160a, b, c, d, and gripper assembly 162 in automated library 150 in FIG. 4. In FIG. 4, the storage array 156 is comprised of two columns 172a, b of storage cells. The storage cells are shown as slots in the columns 172a, b that are capable of holding hard disk drives, such as the dual end disk drive 2 of FIG. 1. For example, storage cells 174a, b, and c include hard disk drives 158a, b, c and storage cells 174d, e are empty. The drive interfaces on the library backplane 160a, b, c, d, referenced as 60 in FIG. 2, include power and data interfaces (not shown) to mate with power 26, 28 and data 18, 20 interfaces on the dual end disk drives 2 (FIG. 1), or the power and data interfaces of hard disk drives known in the art. The gripper assembly and drive interface 162, shown as 62 in FIGS. 2 and 3, can move vertically along vertical shaft 180 and horizontally along horizontal shafts 182a, b. Those skilled in the art will appreciate that there are numerous ways to implement the layout of an automated library, including storage cells and drives at different locations. For instance, in certain implementations, the gripper assembly and drive interface 162 may have to move along a track on the floor to access different storage arrays and different drive interfaces on the library backplane. Although FIG. 4 illustrates two columns of storage cells (bins), in additional implementations, the storage array may include several columns of storage cells. In such case, the gripper assembly 162 would include the capability to traverse in the horizontal and vertical directions to access any storage cell in the storage array 56.

Figure 5:
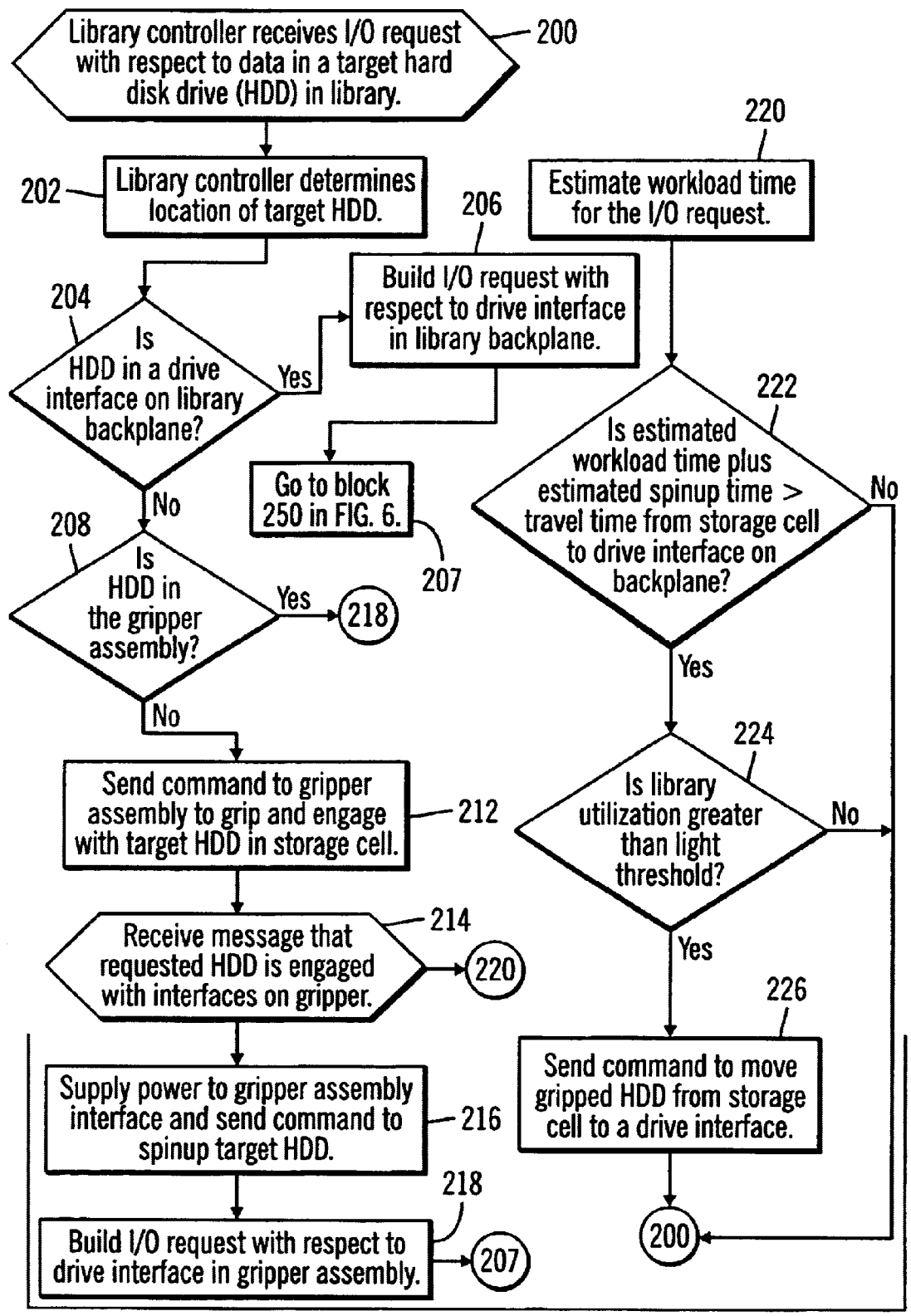
FIGS. 5 and 6 illustrate logic implemented in the library controller to transfer Input/Output (I/O) requests to the storage device in accordance with implementations of the invention.
Figure 6:
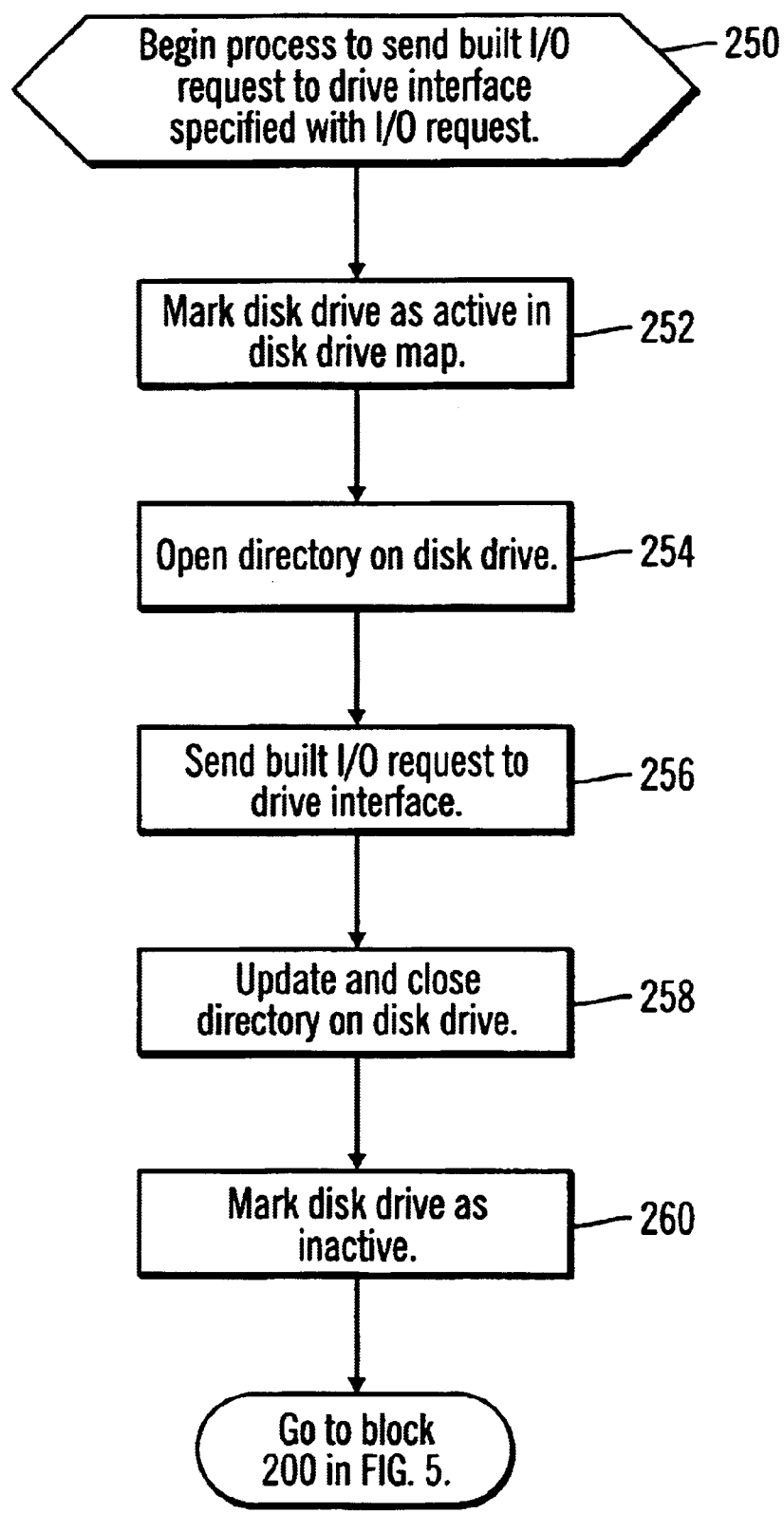

FIGS. 5 and 6 illustrate logic implemented in the library controller 52 (FIG. 2) to manage a library of dual-end hard disk drives 2 (FIG. 1a) and I/O requests directed to the hard disk drives. Control begins at block 200 with the library controller 52 receiving an I/O request with respect to a volume in one dual-end hard disk drive (HDD) in the automated library. The library controller 52 determines (at block 202) the current location of a target hard disk drive 158a, b, c (FIG. 4) including data subject to the I/O request. With reference to FIGS. 1a, 2 and 4, the target hard disk drive may be at one of three locations in the library 50, within a storage cell 174a, b, c, d, e in the storage array 56, 156; held in the gripper assembly and drive interface 62, 162; or engaged with a drive interface on the library backplane 60, 160a, b, c, d. If (at block 204) the target hard disk drive (HDD) is in a disk drive interface on the library backplane 60, 160a, b, c, d then the library controller 52 builds (at block 206) an I/O request to the device address of the drive interface on the library backplane 60, 160a, b, c, d engaged with the target hard disk drive. Control then proceeds (at block 207) to block 250 in FIG. 6 to send the I/O request to the drive interface. Otherwise, if (at block 208) the target hard disk drive (HDD) is engaged in the gripper assembly 62, 162 (FIG. 3), then the library controller 52 proceeds to block 220 to estimate the workload time of the job to determine whether to transfer the tape to a drive interface on the library backplane 160, 160a, b, c, d.

If (at block 208) the target hard disk drive is not engaged with the drive interface of the gripper assembly 62, 162 or library backplane 160, 160a, b, c, d, then the target hard disk drive (HDD) must be located in a storage cell, e.g., storage cell 174a, b, c, d, e (FIG. 4) in the storage array 56, 156. In such case, the library controller 52 sends (at block 212) a command to the gripper assembly 62, 162 to engage and grip the target hard disk drive (HDD) in its cell in the storage array 56, 156. Upon receiving (at block 214) a message or signal from the gripper assembly 62, 162 indicating that the target hard disk drive (HDD) is engaged with the interfaces on the gripper assembly 62, 162, the the library controller 52 performs two different branches of action. The first branch involves supplying power (at block 216) to the power interface 114 (FIG. 3) on the gripper assembly 62, 162 and building (at block 218) the I/O request to send to the gripper assembly 62, 162. Control then proceeds (at block 207) to block 250 in FIG. 6 to send the built I/O request to the gripper assembly drive interface 62, 162.

The second branch from block 214 involves the library controller 52 determining whether to move the target hard disk drive to a drive interface on the library backplane 60, 160a, b, c, d or to complete the I/O request through the gripper assembly drive interface 62, 162 without moving the target disk drive to the drive interface on the library backplane 60, 160a, b, c, d. To make this determination, the library controller 52 estimates (at block 220) the workload time of the I/O request. The estimated workload time may be determined by an equation that calculates workload as a function of the number of blocks involved in the I/O request and the type of I/O request, i.e., read/write. The library controller 52 then determines (at block 222) whether the estimated workload time plus the estimated disk spin-up or initialization time, i.e., the time to initialize the target disk for I/O operations, which may be a predetermined fixed number, is greater than the estimated travel time from the storage cell including the target hard disk drive to the drive interface on the library backplane 60, 160a, b, c, d. For the estimated travel time, the library controller 52 may use a predetermined average travel time based on historical data, or calculate the estimated travel time based on the distance to travel from the specific storage cell 174a, b, c, d, e to the drive interface on the library backplane 160a, b, c, d.

If (at block 222) the estimated workload time and disk spin-up initialization exceeds the travel time, then it would be advantageous to transfer the target hard disk drive to the drive interface on the library backplane 60, 160a, b, c, d. The I/O operation can be initiated while the target hard disk drive is in the gripper assembly and the remainder of the I/O operation can be performed at the drive interface on the library backplane 60, 160a, b, c, d. This will free-up the gripper assembly 62, 162 to service additional I/O requests at other hard disk drives in the storage array 56, 156. In such case, the library controller 52 further determines (at block 224) if the current library utilization is less than a light utilization threshold value indicating a low utilization. If the current library utilization is relatively low, then the I/O request can be serviced entirely through the gripper assembly data interface 62, 162 without affecting system performance because it is unlikely that the gripper assembly 62, 162 will be needed for another I/O request before the current I/O operation completes.

The library utilization indicates the percentage of time the gripper assembly 62, 162 is occupied engaging hard disk drives. The utilization can be determined by dividing the hard disk drive mount requests performed over a past time period, e.g., hour, by the maximum number of mount requests that can be performed in an hour. The time to perform a mount includes the time to remove a hard disk drive from one of the drive interfaces on the library backplane 60, 160a, b, c, d, return the removed drive to its storage cell, access the target hard disk drive from another storage cell and then move the accessed hard disk drive to the disk drive interface on the library backplane 60, 160a, b, c, d. For instance, if the gripper assembly 60, 162 takes ten seconds to mount a hard disk drive (HDD) from a storage cell, then the maximum mounts per hour is 360. The actual number of mounts per hour is then divided by this maximum amount, e.g., 360, to obtain the gripper assembly 62, 162 utilization. Further, the gripper assembly 62, 162 response time or time to service is set forth in equation (1) below, where the variable U is the gripper assembly 62, 162 utilization and "Service Time" is some average time for the gripper assembly 62, 162 to complete a mount request.

$$\text{Response Time} = \frac{1}{(1-U)} * \text{Service Time} \quad (1)$$

With equation (1) above, the more the gripper assembly 62, 162 is utilized, the longer the queue time that increases the base service time. For example, when utilization (U) is zero, the response time equals the service time. However, as the utilization (U) approaches unity, the response time goes to infinity.

If (at block 224) the library utilization is greater than the low utilization threshold, i.e., the library is highly utilized, then the library controller 52 sends (at block 226) the command to move the gripper 62, 162 engaging the target hard disk drive (HDD) to one drive interface on the library backplane 60, 160a, b, c, d. In this way, while the gripper assembly 62, 162 is en route to the disk drive interface 60, 160a, b, c, d, the disk drive can be initialized and data can be transferred to partially or fully complete I/O requests, thereby minimizing any delays in processing I/Os. If the conditions at blocks 222 and 224 are not satisfied, then the target hard disk drive is not moved to a drive interface on the library backplane 60, 160a, b, c, d.

After the library controller 52 builds the I/O request at block 206 or 218 to a drive interface at the gripper assembly 62, 162 or library backplane 60, 160a, b, c, d, control proceeds (at block 207) to block 250 in FIG. 6 to transmit (at block 250) the I/O request to the hard disk drive. With respect to FIG. 6, at block 252, the library controller 52 marks (at block 252) the disk drive as inactive in the disk drive map 64 and transmits a command to open (at block 254) the directory on the disk drive. The library controller 52 then transmits (at block 256) the built I/O request to the drive interface including the hard disk drive. After completing all I/O requests against the hard disk drive, the library controller 52 updates (at block 258) and closes the directory on the target hard disk drive and marks (at block 260) the hard disk drive as inactive in the disk drive map 64. Control then proceeds to block 200 in FIG. 5 to process further received I/O requests.

Figure 7:
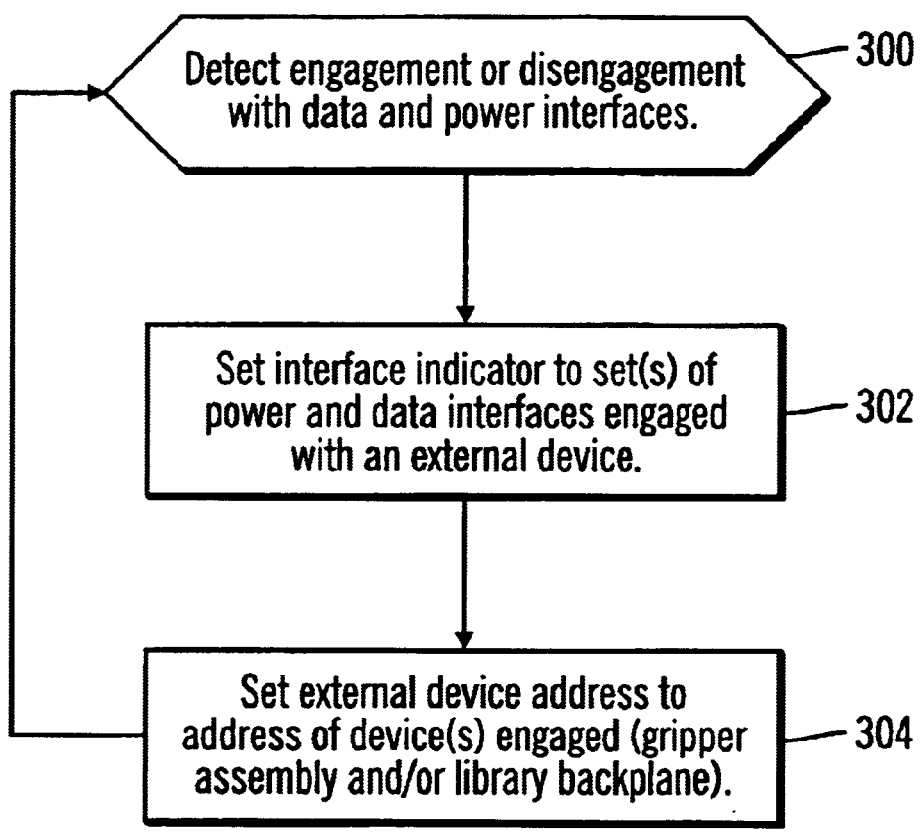
FIGS. 7, 8, and 9 illustrate logic implemented in the storage device to use one of the two data interfaces to communicate data to the library controller in accordance with implementations of the invention.
Figure 8:
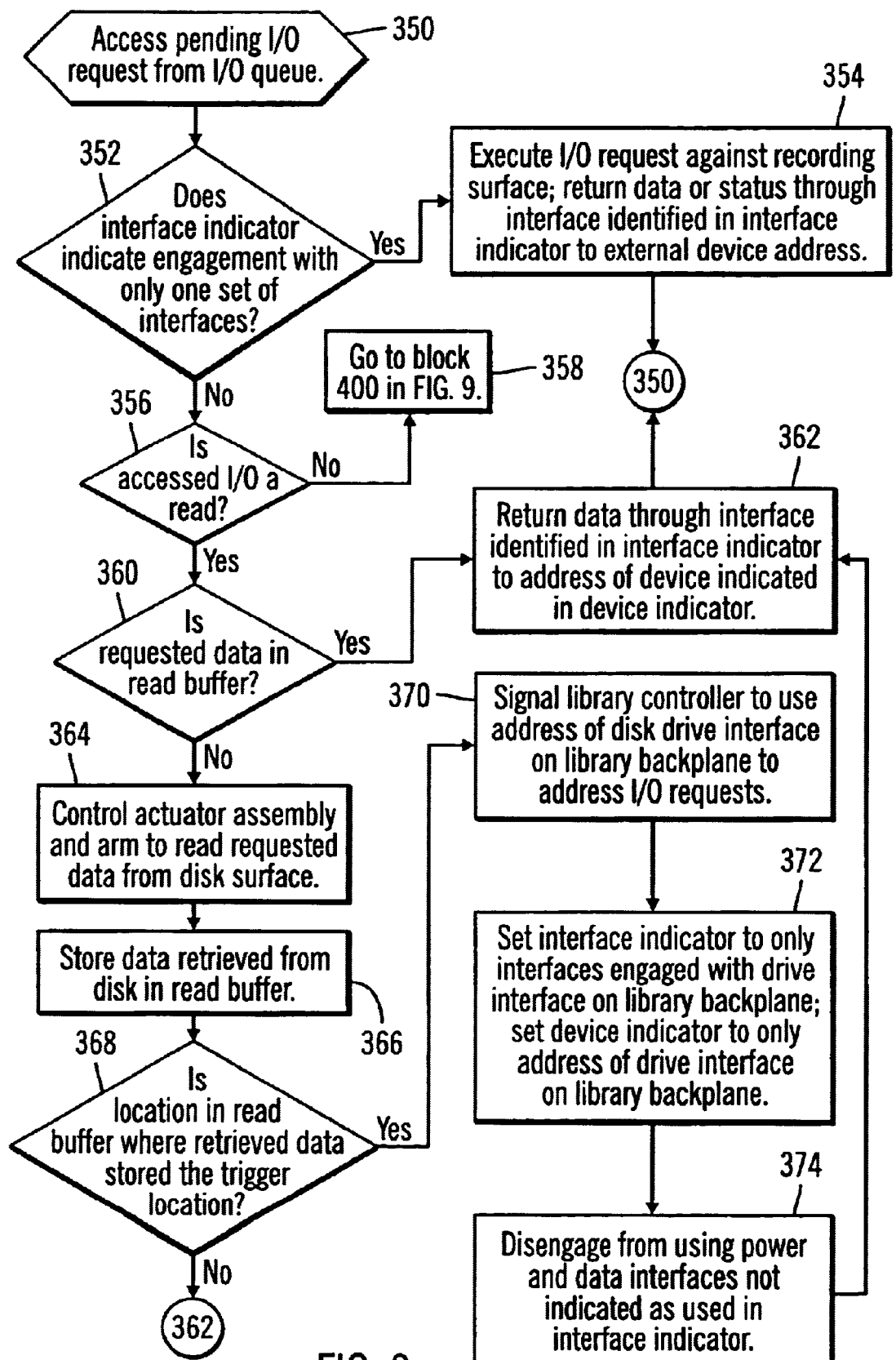
Figure 9:
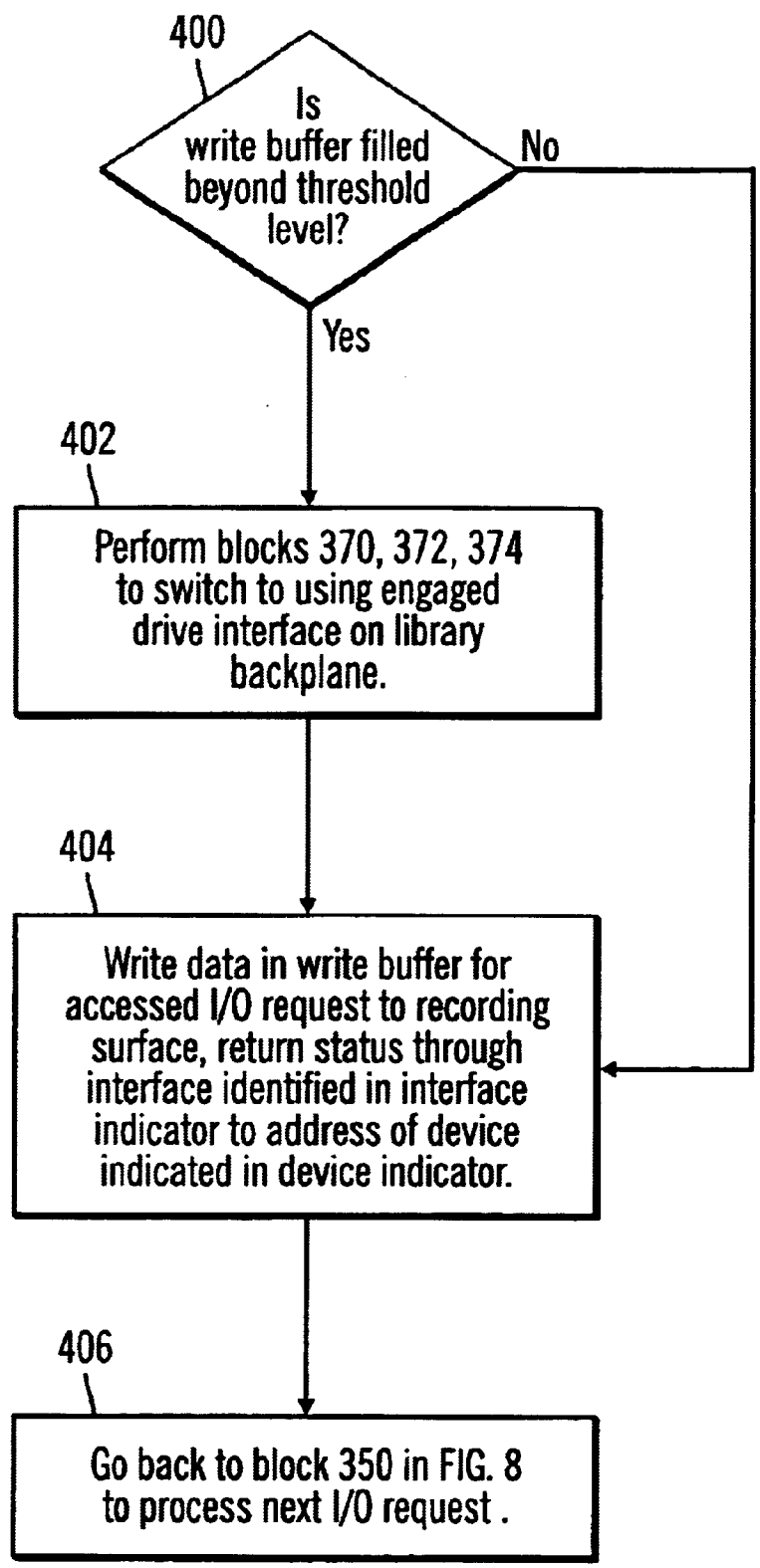

FIGS. 7, 8, and 9 illustrate logic implemented in the disk drive controller 22 of the dual-end disk drive 2 of FIG. 1a to execute I/O requests. With respect to FIG. 7, upon the disk drive controller 22 detecting (at block 300) engagement or disengagement with one set of data 18, 20 and power 26, 28 interfaces on one end of the housing 4, the disk drive controller 22 sets (at block 302) the interface indicator 40 to the set of data 18, 20 and power 26, 28 interfaces that are currently engaged, which can indicate no sets engaged, one set engaged or both sets on both ends engaged. This information enables the disk drive controller 22 to determine which interfaces are available for data and power communication. At block 304, the disk drive controller 2 sets the external device address 304 to the address of the external device(s) engaged through the interfaces 18, 20, i.e., the address of the drive interface on the gripper assembly 62 and/or library backplane 60. From block 302, control returns to block 300 to detect any further engagements or disengagements with interfaces.

FIGS. 8 and 9 illustrate logic the disk drive controller 22 executes to process I/O requests in the I/O queue 38. Control begins at block 350 with the disk drive controller 22 accessing a pending I/O request in the I/O queue 38. If (at block 352) the interface indicator 40 indicates engagement with only one of data 18, 20 and power 26, 28 interfaces, then the disk drive controller 22 executes the I/O request against the recording surface 8, i.e., performs the requested read or write operation, and then returns data or status through the interface identified in the interface indicator 40 to the external device address 42. If the I/O request is a read and the requested data is in the read buffer 34, then the disk drive controller 22 can return the requested data from the read buffer 34 without having to read the requested data from the recording surface 8.

If (at block 352) the interface indicator 40 indicates engagement with the data 18, 20 and power 26, 28 interfaces on both ends, i.e., both primary and secondary set of interfaces, then the disk drive controller 22 proceeds (at block 358) to block 400 in FIG. 9 if (at block 356) the I/O request is a write. If the I/O request is a read (at block 356)

and the requested data is in the read buffer 34 (at block 360), then the disk drive controller 22 returns (at block 362) the requested data from the read buffer 34 through the primary data 18, 20 interface indicated in the interface indicator 40 to the external device address 42. If the requested data is not in the read buffer 34, then the disk drive controller 22 instructs (at block 364) the actuator assembly 10 and arm 12 to read the requested data from the recording surface 8. The data retrieved from the recording surface 8 is stored (at block 366) in the read buffer 34.

In certain implementations, the disk drive controller 22 maintains a trigger pointer to a location in the read buffer 34 to use as an indicator of when to switch from using the data 18 and power 26 interfaces on one end to using the interfaces on the other end, i.e., using the data 20 and power 28 interfaces. Such a switch would involve switching from using the data 112 and power 114 interfaces on the gripper assembly 62 (FIG. 3) to using the drive interfaces on the library backplane 60, 160a, b, c, d. In certain implementations, the trigger pointer would point to the end of a sector boundary, so that the transition to another data interface 18, 20 occurs at the end of one sector boundary and before the beginning of the next sector. Transitioning to the other data interface 18, 20 at the end of a sector boundary does not interfere with the transmission or receipt of any error correction or longitudinal redundancy codes, which are typically located at the end of a sector boundary to provide error correction for the data in the sector. Additionally, the size of the buffer 34, 36 may determine when to transition from using one data interface 18, 20 to the other. For instance, if the file involved in the read/write operation is larger than the buffer 34, 36 used, then the disk drive controller 22 would switch data interfaces 18, 20 on the sector boundary. However, if the file(s) are smaller than the buffer 34, 36, then the controller 22 may switch data interfaces 18, 20 at the conclusion of one file, and before beginning the read/write with respect to another file.

If (at block 368) the controller 22 stores data to the read buffer 34 location addressed by the trigger pointer after detecting that the data 18, 20 and power 26, 28 interfaces are engaged on both ends, then the controller 22 signals (at block 370) the library controller 52 to use the disk drive interfaces on the library backplane 60, 160a, b, c, d instead of the gripper assembly drive interface 62, 162. To use the interfaces on the other end, the controller 22 would set (at block 372) the interface indicator 40 to only the interfaces engaged with the drive interface on the library backplane 60, 160a, b, c, d and set the external device address 42 to the address of the drive interface on the library backplane 60, 160a, b, c, d, i.e., the secondary interface and address in the interface indicator 40 and external device address 42 become the primary. Upon receiving this message, the library controller 52 would then set a flag or other indicator to address the disk drive data interface 58 to send data to the subject hard disk drive. The disk drive controller 22 then disengages (at block 374) from using the primary end, which is the end engaged with the gripper assembly and drive interface 62, 162. The disk drive controller 22 would then return (at block 362) the requested data to the disk drive interface on the library backplane 60, 160a, b, c, d and use the library backplane for subsequent I/O requests. If (at block 368) the retrieved data is not stored at the trigger pointer location, then the controller 22 returns (at block 362) the requested data through the gripper data interface 112 (FIG. 3) to the library controller 52 (FIG. 2).

If (at block 356) the I/O request was a write, then the disk drive controller 22 determines (at block 400 in FIG. 9) whether the write buffer 36 is filled beyond a threshold level. If so, then the disk drive controller 22 performs (at block 402) blocks 370, 372, and 374 to switch and signal the library controller 52 to switch to using the engaged drive interface on the library backplane 60, 160a, b, c, d. The disk drive controller 22 then writes (at block 404) the data in the write buffer 36 to the recording surface 8 (FIG. 1a) and returns status through the primary interface identified in the interface indicator 40 to the primary device address indicated in the external device address 42. Control then proceeds (at block 406) to block 350 in FIG. 8 to process the next I/O request. If (at block 400) the write buffer 36 is not filled beyond the threshold, then control proceeds to block 404 to process the write request. Signaling the library controller 52 after the write buffer 36 fills to a threshold level minimizes down time because even if the library controller 52 experiences delays in streaming write requests upon receiving the message to switch to using the drive interface 58 address, such delays at the library controller 52 end will not affect performance because the disk drive controller 22 can continue to access and process pending write requests in the write buffer 36. The threshold level is set sufficiently high so that the write buffer 36 continues to supply write requests for the controller 22 to process during any delay the library controller 52 experiences in submitting write requests when switching to the drive interface on the library backplane 60, 162, a, b, c, d to access the hard disk drive.

In implementations where the gripper assembly includes a drive interface, the dual end disk drive would be engaged with the gripper assembly and drive interface 62, 162 upon the first detected engagement. The second detected engagement would be with the drive interface on the library backplane 60, 160a, b, c, d. In such implementations, the logic may take this sequence of events into account to prevent any switching over to another interface after the first switch and disengagement once the disk drive is engaged with the drive interface on the library backplane 60, 160a, b, c, d where the dual end disk drive will remain until I/O completes and the disk drive is removed and returned back to a storage cell. In alternative implementations the assumptions in the logic may differ depending on the architecture of the library.

The described implementations provide a design for the disk drives and the gripper assembly that minimizes time to access the hard disk drive, even as the hard disk drives are transferred from the storage array 56, 152a, b to the drive interfaces 60, 160a, b, c, d as the hard disk drive can be accessed through the gripper assembly 62, 162. This dual-end hard disk drive design further minimizes any delays in accessing the disk because the gripper 62, 162 (FIGS. 2, 3, 4) does not need to turn the disk drive around in order to mount the disk drive onto the drive interface on the library backplane 62, 162a, b, c, d. Still further, because the disk drives are dual-end, they can be swapped between pickers without the need to rotate the hard disk drive or interrupt the I/O flow. For instance, when swapping a dual-end hard disk drive between pickers, both pickers can be engaged with the data interfaces at opposite of the hard disk drive. This allows pickers to swap a hard disk drive and time the disengagement of one picker to minimize any interruption to data flow. Pickers on the same track may also swap hard disk drives to avoid collisions. Still further, the dual-end hard disk drives would not have to be rotated in either an Input/Output station or a pass-through station between library modules because they may be engaged from either end.

Additional Implementation Details

The preferred embodiments may be implemented as a method, apparatus or article of manufacture using standard programing and/or engineering techniques to produce software, firmware, hardware, or any combination thereof The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, progrармable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the gripper assembly 62 moves the disk drive to the drive interface 60 (160a, b, c, d). However, in an alternative implementation, the library may employ one or more grippers 62 to move between the dual-end hard disk drives and engage the disk drive to provide access without ever moving the hard disk drive to a driver interface.

FIG. 4 illustrated one possible implementation of the automated library, including columns of storage arrays with the disk drive interfaces 58 directly in the column in the cells. In additional implementations, the library may comprise a large enclosure and the gripper assembly may be capable of moving along a track to different storage arrays and bays of drive interfaces.

In the described implementations, the storage device comprised a dual-end hard disk drive. In alternative implementations, the storage device may comprise any storage device known in the art maintained in a housing that provides non-volatile storage of data that can be accessed from different locations or ends on the housing including the storage medium. In the described implementations, the storage medium comprised a magnetic disk surface. In alternative implementations, the storage medium may comprise other storage mediums known in the art, such as an electronic storage device, etc.

In the described implementations, the two sets of interfaces were placed on opposite ends of the housing. Additionally, the duplicate data and power interfaces may be placed on any two planes of the housing. Additionally, there may be more than two sets of interfaces on the housing to provide for still additional degrees of access to the storage device.

The logic implementation of FIGS. 5–9 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A gripper assembly including a gripper capable of engaging a storage device comprising a storage device data interface through which data is transferred to a storage medium within the storage device, comprising:

extending members capable of engaging the storage device;

a gripper data interface capable of engaging the storage device data interface to allow data communication between the storage medium in the storage device and the gripper assembly when the extending members are engaging the storage device; and movement electronics to move the gripper in at least one direction.

2. The gripper assembly of claim 1, wherein the storage device further includes a power interface through which power is supplied to the storage device, further comprising:

a power interface capable of engaging the storage device power interface to transfer power to the storage device.

3. The gripper assembly of claim 2, wherein power is supplied from a power source external to the gripper assembly.

4. The gripper assembly of claim 2, further comprising a power supply, wherein the power supplies power to the storage device power interface.

5. The gripper assembly of claim 2, wherein the power interface is capable of providing power to initialize the storage device while the gripper assembly moves the storage device from a first location to a second location.

6. The gripper assembly of claim 2, wherein the gripper data interface is capable of data communication with the storage device while the gripper assembly moves the storage device from a first location to a second location.

7. The gripper assembly of claim 1, further comprising:

a shaft;

a mounting bracket for engaging the shaft, wherein the movement electronics is capable of moving the gripper assembly along the shaft.

8. The gripper assembly of claim 1, wherein the movement electronics is capable of moving the gripper assembly through different planes of movement.

9. The gripper assembly of claim 8, wherein the movement electronics is capable of moving the gripper assembly in both a horizontal and vertical orientation to access storage devices in a multi-column storage array including bins capable of including storage devices.

10. The gripper assembly of claim 1, further comprising logic for receiving a command to cease transmitting power to the storage device.

11. The gripper assembly of claim 1, further comprising protrusions on the extended members capable of mating with indentations on the storage device.

12. The gripper assembly of claim 11, wherein the protrusions are capable of mating with indentations on any two sides of the storage device.

13. The gripper assembly of claim 1, wherein the gripper data interface on the gripper assembly is further capable of communicating Input/Output requests to the storage device.

14. A gripper assembly for engaging a storage device comprising a storage device data interface through which data is transferred to a storage medium within the storage device, comprising:

a gripper data interface;

means for engaging the storage device;

means for engaging the storage device data interface with the gripper data interface to allow data communication between the storage medium in the storage device and the gripper assembly when the extending members are engaging the storage device; and means for moving the gripper device in at least one direction.

15. The gripper assembly of claim 14, wherein the storage device further includes a power interface through which power is supplied to the storage device, further comprising:

means for engaging the storage device power interface to transfer power to the storage device.

16. The gripper assembly of claim 15, wherein power is supplied from a power source external to the gripper assembly.

17. The gripper assembly of claim 15, further comprising a power supply, wherein the power supplies power to the storage device power interface.

18. The gripper assembly of claim 15, further comprising means for providing power to initialize the storage device while moving the storage device from a first location to a second location.

19. The gripper assembly of claim 15, further comprising means for communicating data to the storage device while moving the storage device from a first location to a second location.

20. The gripper assembly of claim 14, further comprising:

a shaft; and means for engaging the shaft and moving the gripper assembly along the shaft.

21. The gripper assembly of claim 14, further comprising means for moving the gripper assembly through different planes of movement.

22. The gripper assembly of claim 21, further comprising means for moving the gripper assembly in both a horizontal and vertical orientation to access storage devices in a multi-column storage array including bins capable of including storage devices.

23. The gripper assembly of claim 14, further comprising means for receiving a command to cease transmitting power to the storage device.

24. The gripper assembly of claim 14, further comprising means for mating with indentations on the storage device.

25. The gripper assembly of claim 14, wherein the means for engaging the storage device data interface is further capable of communicating Input/Output requests to the storage device.

26. A gripper assembly including a gripper capable of engaging a storage device comprising a storage device data interface through which data is transferred to a storage medium within the storage device and receiving commands from an external controller, comprising:

an interface for communicating with the external controller;

extending members capable of engaging the storage device;

a gripper data interface capable of engaging the storage device data interface to allow data communication between the storage medium in the storage device and the external controller; and movement electronics to move the gripper in at least one direction in response to commands from the external controller.

27. The gripper assembly of claim 26, wherein the storage device further includes a power interface through which power is supplied to the storage device, further comprising:

a power interface capable of engaging the storage device power interface to transfer power to the storage device.

28. The gripper assembly of claim 27, wherein power is supplied from a power source external to the gripper assembly.

29. The gripper assembly of claim 26, wherein the gripper data interface is capable communicating data between the storage device and external controller while the gripper assembly moves the storage device from a first location to a second location.

30. The gripper assembly of claim 26, wherein the movement electronics is capable of moving the gripper assembly in both a horizontal and vertical orientation to access storage devices in a multi-column storage array including bins capable of including storage devices.

31. The gripper assembly of claim 26, wherein the gripper data interface on the gripper assembly is further capable of communicating Input/Output (I/O) requests to the storage device received from the external controller.

32. The gripper assembly of claim 31, wherein the gripper data interface is further capable of communicating data from the storage device related to the I/O requests to the external controller.

* * * * *